US012138227B2

(12) United States Patent
Singh et al.

(10) Patent No.: US 12,138,227 B2
(45) Date of Patent: Nov. 12, 2024

(54) CAPSULE SEALING SYSTEM AND METHOD THEREFOR

(71) Applicants: ACG PAM PHARMA TECHNOLOGIES PVT. LTD., Mumbai (IN); SCITECH CENTRE, Mumbai (IN)

(72) Inventors: Karan Singh, Mumbai (IN); Prakash Deshmukh, Mumbai (IN); Jayesh Naidu, Mumbai (IN)

( * ) Notice: Subject to any disclaimer, the term of this patent is extended or adjusted under 35 U.S.C. 154(b) by 346 days.

(21) Appl. No.: 17/611,106

(22) PCT Filed: May 2, 2020

(86) PCT No.: PCT/IN2020/050400

§ 371 (c)(1),
(2) Date: Nov. 12, 2021

(87) PCT Pub. No.: WO2020/230151

PCT Pub. Date: Nov. 19, 2020

(65) Prior Publication Data

US 2022/0079844 A1 Mar. 17, 2022

(30) Foreign Application Priority Data

May 15, 2019 (IN) ............................ 201921019446

(51) Int. Cl.
*A61J 3/07* (2006.01)

(52) U.S. Cl.
CPC .................................... *A61J 3/072* (2013.01)

(58) Field of Classification Search
CPC ........ A61J 1/03; A61J 3/00; A61J 3/07; A61J 3/072; A61J 2200/42
See application file for complete search history.

(56) References Cited

U.S. PATENT DOCUMENTS

| | | | | |
|---|---|---|---|---|
| 4,677,812 | A * | 7/1987 | Tayebi | B29C 66/83411 53/900 |
| 8,181,425 | B2 * | 5/2012 | Mccutcheon | A61J 3/072 53/329.2 |
| 9,340,004 | B2 * | 5/2016 | Van Rooyen | B32B 38/18 |

* cited by examiner

*Primary Examiner* — Vishal I Patel

(57) ABSTRACT

A capsule sealing system comprising: a heating unit for mounting on a capsule filling machine and receiving therein a plurality of filled capsules (FC) from the capsule filling machine, the heating unit comprising a first plate and a second plate spaced apart from each other by at least one biasing means, each plate having a plurality of grooves forming a plurality of circular holes between the plates when abutted to each other against the biasing means, to capture and heat seal each capsule; and an engaging mechanism for abutting the first and second plates against the biasing means.

10 Claims, 9 Drawing Sheets

CAPSULE SEALING SYSTEM AND METHOD THEREFOR

FIELD OF INVENTION

The present invention relates to sealing of capsules. More particularly, the present invention relates to heat/thermal sealing of capsules.

BACKGROUND

Manufacturing of solid oral dosage forms such as capsules involves mixing together various pharmaceutical ingredients/powders, liquids, pellets, granules such as active pharmaceutical ingredients (APIs), excipients, etc., and filling capsules with the mixture of the APIs and excipients in a capsule filling machine to produce capsules containing dosage of a desired quantity.

The filled capsules are then typically transferred to another sealing machine where the capsules are sealed to prevent leakage or seepage of the ingredients from the capsules. Conventionally, capsules are sealed by band sealing technique/process where sealants are used to seal a cap and a body of a capsule at an overlapping portion of the cap and body when joined telescopically. There have been several endeavours to develop sealing techniques for sealing capsules through band sealing.

Capsugel have developed a Licaps® sealing process that involves wetting wall contact areas between the cap and the body of capsules with a melting point lowering liquid. After removal of excess wetting liquid, the wall contact areas are thermally bonded. However, to obtain a homogeneous seal, it is important that the wall contact areas are exposed uniformly to the liquid, which is achieved through capillary action for drawing the liquid into the area between the overlapping walls of the cap and body of the capsule.

U.S. Pat. No. 4,539,060 mentions sealing of capsules by using sealing fluids and/or thermal energy. The capsules are dipped in sealing fluid which enters into the overlap portion of the cap and body of the capsules by capillary action. The sealing fluid is then removed from the surface of the capsules, and thermal energy is applied for about two seconds to the overlap so as to cause peptization or denaturation of the gelatin and sealing fluid within the overlap, thereby causing a sealing of the cap and body of the capsules.

U.S. Pat. No. 4,724,019 mentions sealing of hard gelatin capsules by applying metered amounts of a wetting fluid between the overlapping side walls of the body of the capsules to to pass by capillary action into the space between the overlapping cap and body side walls, and thermally treating the wetting fluid-containing capsule to remove fluid therefrom and fuse the overlapping side walls of the cap and body of the capsule.

U.S. Pat. No. 4,756,902 mentions sealing of capsules by contacting the cap and body juncture of the capsule with a sealing fluid containing alcohol-water solution maintained between 40° C. to 100° C. to form a liquid seal, and applying a gelatin band to gird the capsule in the area of the liquid seal.

U.S. Pat. No. 4,656,066 mentions sealing of capsules using denaturation melting-point depression mixtures and hot air.

All the aforementioned conventional capsule sealing techniques/processes involve use of various mediums such as liquid, fluids for sealing which has an inherent disadvantage in that separate machines/apparatuses are required to seal the capsules. Such separate machines/apparatus are costly as they have a large number of spare parts, need extensive floor space, and experts to operate and repair them, which makes use of such machines inconvenient. There is therefore felt a need for an invention which eliminates the disadvantages and inconveniences inherent to the prior art as stated above.

SUMMARY

This summary is provided to introduce concepts related to the present invention. This summary is neither intended to identify essential features of the present invention nor is it intended for use in determining or limiting the scope of the present invention.

Accordingly, in an aspect of the present invention, there is provided a sealing system for capsule filling machine, the system comprising: a heating unit for mounting on the capsule filling machine and receiving therein a plurality of filled capsules from a capsule holder of the capsule filling machine, the heating unit comprising a first plate and a second plate spaced apart from each other by at least one biasing means, each plate having a plurality of grooves forming a plurality of circular holes between the plates when abutted to each other against the biasing means, to capture and heat seal each capsule at one or more places by heat fusion of at least a cap of the capsule; and an engaging mechanism for abutting the first and second plates of the heating unit against the biasing means.

In an embodiment, the first and second plates are disposed adjacent to each other in a housing, and each of the first and second plates include: a plurality of slots forming a plurality of keyholes between the plates when disposed adjacent to each other in the housing, each keyhole accommodating the biasing means; a heating channel with a heating element placed therein for heating of the plates; and at least a temperature sensor placed within at least one of the first and second plates to sense the temperature of the plates.

Generally, the biasing means is a spring.

In an embodiment, the heating unit is attached to a bottom surface of a capsule ejecting chute of the capsule filling machine and positioned above the capsule holder having a plurality of through-holes holding the plurality of filled capsules; the housing includes a third plate affixed to a fourth plate, each of the third and fourth plates having a plurality of through-holes formed therein; and the circular holes formed between the first and second plates align with the through-holes of the third and fourth plates to form a plurality of passages through the heating unit, and the passages align with the plurality of through-holes of the capsule holder and a plurality of holes in the capsule ejecting chute when the heating unit is attached to the bottom surface of the capsule ejecting chute and positioned above the capsule holder.

Typically, the first and second plates are made from heat conducting material selected from metal and metal alloys.

Typically, the third and fourth plates made from heat insulating material.

Typically, the one or more places are within overlapping portions of the cap and the body of each capsule.

In an embodiment, the engaging mechanism comprises: at least one pneumatic cylinder for mounting on the capsule filling machine; at least one cam plate operatively coupled to the pneumatic cylinder to be vertically displaced by the pneumatic cylinder; and at least one cam follower pin affixed to each of the first and second plates to be horizontally displaced by the cam plate, wherein the horizontal displacement of the cam follower pins enables the first and second plates to abut each other against the bias to form the circular holes.

Typically, the at least one cam plate includes two arms, each arm having at least a wedge shaped surface tangentially engaging each cam follower pin to horizontally displace the first and second plates through vertical displacement of the cam plate.

In an embodiment, the at least one pneumatic cylinder is mounted on the capsule ejecting chute of the capsule filling machine; and one or more cam plate guides are mounted on the capsule ejecting chute for sliding of the arms within the cam plate guides for vertical displacement of the cam plate.

In another aspect of the present invention, there is provided, a method for sealing of a capsule, the method comprising a step of heating cap and a body of the capsule at one or more places within overlapping portions of the cap and body of the capsule, to heat fuse at least the cap of the capsule.

Advantageously, the one or more places are in the middle of the capsule or is offset from the middle of the capsule.

BRIEF DESCRIPTION OF ACCOMPANYING DRAWINGS

The detailed description is described with reference to the accompanying figures. In the figures, the left-most digit(s) of a reference number identifies the figure in which the reference number first appears. The same numbers are used throughout the drawings to reference like features and units.

FIG. 1*a* illustrates a representative view of a closed capsule.

FIG. 1*b* illustrates a representative diagram depicting a turret of a capsule filling machine.

FIGS. 2*a*-2*d* illustrate perspective views depicting a capsule sealing system according to the present invention.

FIG. 3*a* illustrates a sectional view depicting a heating unit of the capsule sealing system as illustrated in FIG. 2*d*.

FIG. 3*b* illustrates a perspective view depicting a housing of the heating unit of the capsule sealing system as illustrated in FIG. 2*d*.

FIG. 3*c* illustrates a representative view depicting a heat sealed capsule.

FIG. 3*d* illustrates representative views depicting the heat sealing of a capsule at different places on the surface of the capsule, by the capsule sealing system.

FIG. 3*e* illustrates a representative view depicting the heat sealing capsule at one or more places on the surface of the capsule, by the capsule sealing system.

FIG. 4 illustrates an exploded view depicting the positioning of a heating unit of the capsule sealing system as illustrated in FIG. 2*b*.

FIGS. 5*a* and 5*b* illustrate front and side views depicting a cam plate of the capsule sealing system as illustrated in FIG. 2*a*.

DETAILED DESCRIPTION

Figure 1A:
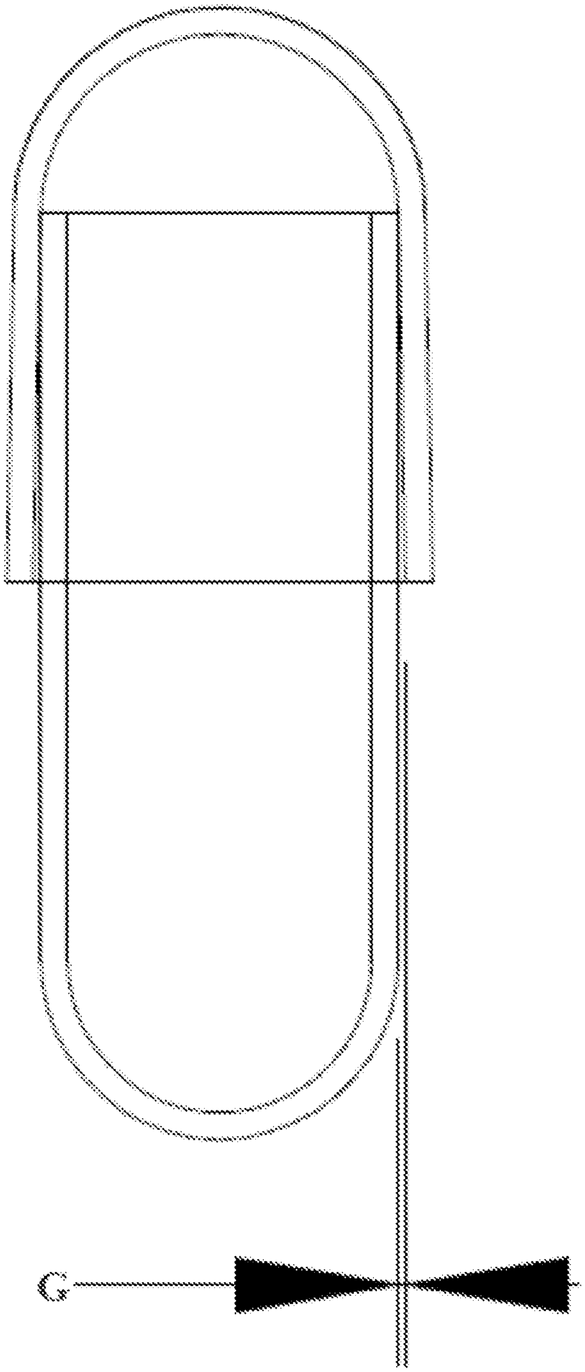

A capsule is typically made of two prefabricated cylindrical shells referred to as a cap and a body, one end of each of which is rounded and closed, and the other end of which is open. In a capsule filling machine, a pharmaceutical and/or a nutraceutical ingredient is filled in the body of the capsule and the cap is closed over the body to telescopically join the cap and body. Generally, the cap concentrically overlaps the body when the cap and body are telescopically joined. However, when viewed microscopically, a miniscule gap (G) is observed in the overlapping portion between the cap and the body of the closed capsule, as illustrated in FIG. 1*a*.

A filled capsule may get contaminated if oxygen and/or water/moisture enters in the capsule through the miniscule gap in the overlapping portion between the cap and body of the capsule. Further, the shell of the capsule in dry conditions becomes fragile which makes the shell susceptible over time to cracking, resulting in leakage/seepage of the ingredient from the capsule. Hence it is necessary to effectively seal the capsule to prevent oxygen/moisture from entering in the capsule, as well as prevent leakage/seepage of the ingredient from the capsule. For this purpose, conventionally, filled capsules have been sealed by band sealing technique/process which involves applying liquid sealants on the capsule shell wall in the miniscule gap to seal the cap and the body of the capsule at the overlapping portion of the cap and body joined telescopically. However, band sealing process necessitates the use of various mediums/sealants for sealing the capsules which has an inherent disadvantage of requiring separate external machines/apparatuses wherein the capsules are transferred to seal the capsules.

To solve the aforementioned problems associated with conventional band sealing of capsules and to achieve efficient sealing of capsules, the present invention provides a capsule sealing system implementing a method/technique of sealing capsules that seals capsules by heat/thermal fusion and is deployable within a capsule filling machine itself, thereby eliminating the requirement of external sealing machines/apparatuses.

The present invention will now be described in the following description, where for purpose of explanation, specific details are set forth in order to provide an understanding of the present invention. It will be apparent, however, to one skilled in the art that the present invention may be practiced without these details. One skilled in the art will recognize that embodiments of the present disclosure, some of which are described below, may be incorporated into a number of systems.

However, the invention is not limited to the specific embodiments described herein. Further, the structures shown in the figures are illustrative of exemplary embodiments of the present invention and are meant to avoid obscuring of the present invention.

It should be noted that the description merely illustrates the principles of the present invention. It will thus be appreciated that those skilled in the art will be able to devise various arrangements that, although not explicitly described herein, embody the principles of the present invention. Furthermore, all examples recited herein are principally intended expressly to be only for explanatory purposes to help the reader in understanding the principles of the invention and the concepts contributed by the inventor to furthering the art and are to be construed as being without limitation to such specifically recited examples and conditions. Moreover, all statements herein reciting principles, aspects, and embodiments of the invention, as well as specific examples thereof, are intended to encompass equivalents thereof.

Figure 1B:
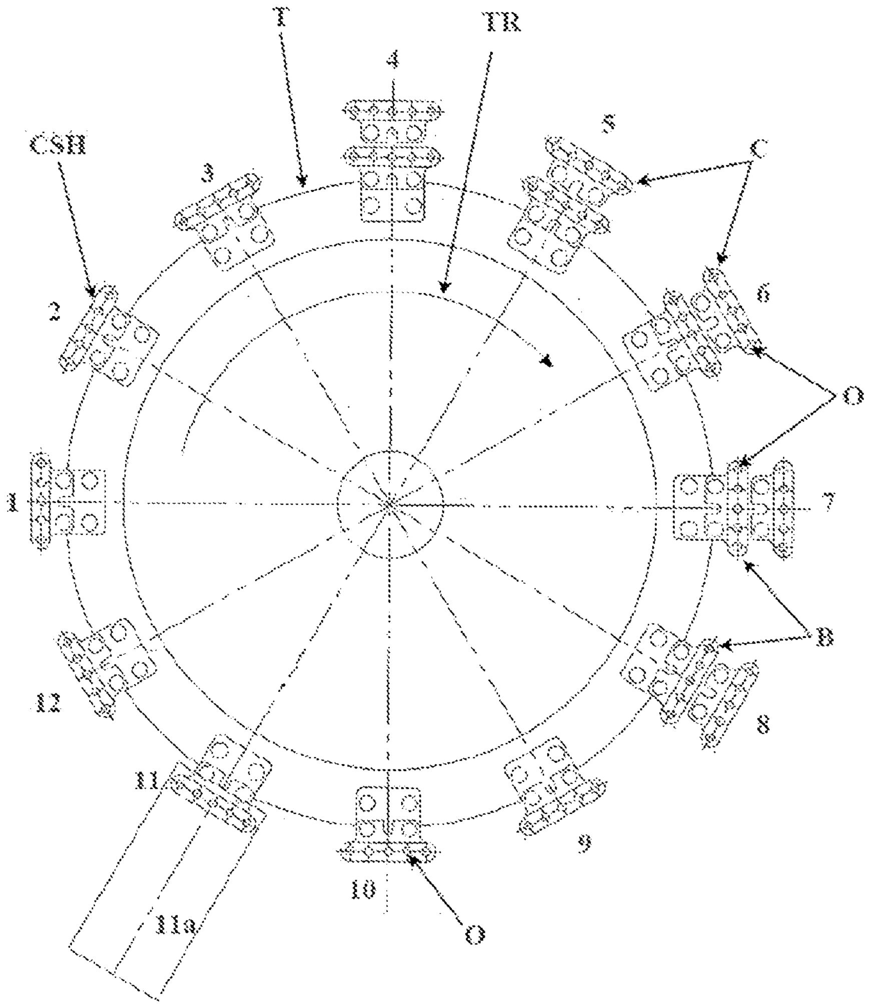

As illustrated in FIG. 1, a capsule filling machine typically comprises a turret (T) in the form of a turn-table comprising a plurality of capsule holders (CSH) circumferentially mounted thereon. Each capsule holder (CSH) comprises a cap holder (C) and a body holder (B) each having a plurality of through-holes (O). Typically, the cap holders (C) are fixedly mounted on the top of the turret (T), and the body holders (B) are affixed to the side or bottom of the turret (T) in a manner such that the body holders (B) can slide out of the turret (T) to enable filling of the pharmaceutical/nutraceutical ingredients in empty capsule bodies held in the body holders (B). The turret (T) rotates, as denoted by arrow (TR), through a plurality of stations such as a loading station (1) for loading empty capsules; an orientation station (2) for automatically orienting the empty capsules in a predetermined orientation where the cap of each capsule is on top and the body of each capsule is below the cap, and separating the cap and the body of each capsule in the cap holder (C) and the body holder (B) respectively; a cap sensing station (3) for checking and confirming the presence of the cap of each capsule in the cap holder (C); a pellet filling station (4), a tamping station (5), a liquid filling station (6), etc., for filling one or more pharmaceutical/nutraceutical ingredients in each capsule body in the body holder (B); unopened capsule ejection station (7) for ejecting unopened capsules; a closing station (9) for closing the cap and the body of each capsule to form filled capsules; filled capsule ejection station (11) with a capsule ejection chute (11*a*) for ejecting the filled capsules typically into a collector placed therebelow; and a cleaning station (12) for cleaning the bushes i.e. holes in the capsule cap holder (C) and body holder (B). The turret (T) may comprise optional stations (8, 10) for performing additional functions such as checking the filled capsules for compliance with predefined quality parameters, rejecting the capsules not complying with the predefined quality parameters, etc.

Conventionally, post ejection, the filled capsules from the collector are transferred to another sealing machine/apparatus where the capsules are sealed by band sealing process. The present invention provides an improved and reliable sealing technique over band sealing, involving heat/thermal fusion of capsules carried out in a sealing system (100) for capsule filling machine, illustrated in FIGS. 2*a*-2*d*. Throughout this specification the phrases 'sealing system for capsule filling machine' and 'capsule sealing system' are used to describe the present invention as they are intended to carry the same meaning in the context of the present invention.

As illustrated in FIGS. 2*a*-2*d*, the capsule sealing system (100) in accordance with the present invention comprises a heating unit and an engaging mechanism. The heating unit is mountable on the capsule filling machine for receiving therein a plurality of filled capsules from the capsule holder (CSH) of the capsule filling machine. The heating unit comprises a first plate (101) and a second plate (102). Both the plates (101, 102) are heat conductive plates enclosed in a housing, and are disposed adjacent to each other in the housing. Typically, both the plates (101, 102) are made from metal and/or metal alloys, and the housing is made from heat insulating materials such as plastic. The plates (101, 102) are spaced apart from each other by a biasing means (103) to prevent the plates (101, 102) from abutting each other when disposed adjacent to each other in the housing.

Referring to 3*a*, each of the first plate (101) and the second plate (102) include a plurality of grooves (104), a plurality of slots (105) and one or more heating channels (106) formed therein. The grooves are carved along inner longitudinal sides of each of the first (101) and second (102) plates to facilitate passing of the capsules received from the capsule holder (CSH) through the plates (101, 102). As the plates are disposed adjacent to each other, the grooves (104) form a plurality of circular holes between the plates (101, 102) when the plates are abutted to each other against the bias of the biasing means. Each capsule that passes through the grooves (104) in the plates (101, 102) gets captured in the circular holes to be heat sealed by heat fusion of at least the cap of the capsule to the body of the capsule. It may be appreciated that the number of grooves (104) is not intended to be limited to five grooves in each plate (101, 102) as shown in the figures, as the same is shown merely for the sake of brevity and understanding of the invention, and that as many number of grooves can be carved in the plates (101, 102) as required, all falling within the scope of the present invention.

The slots (105) are also formed along inner longitudinal sides of each of the first (101) and second (102) plates at locations between the plurality of grooves (104). As the plates are disposed adjacent to each other, the slots (105) form a plurality of keyholes between the plates (101, 102). The biasing means is placed in each keyhole to space apart the plates (101, 102) and prevent the plates from abutting each other. In an embodiment, the biasing means is a spring. It may be appreciated that the number of slots (105) is not intended to be limited to two slots in each plate (101, 102) as shown in the figures, as the same is shown merely for the sake of brevity and understanding of the invention, and that as many number of slots (105) can be formed in the plates (101, 102) as required, all falling within the scope of the present invention.

The heating channels (106) are formed in any one or both the plates (101, 102). In an embodiment, an elongated heating channel (106) channel is longitudinally formed in each of the first (101) and second (102) plates. A heating element is placed in each heating channel (106) for heating the plates to a predetermined temperature required to heat seal the capsules captured in the circular holes between the plates (101, 102). Typically, the heating element is made from metal and/or metal alloys. The predetermined temperature is selected depending on the material of the capsule shell (cap and body), such as gelatin, hypromellose (HPMC), pulluan capsules, and the like, the ingredient filled in the capsules, and the heat conductivity of the plates to ensure that the capsules are not damaged due to overheating of the plates (101, 102), and that the plates (101, 102) are heated to a temperature just sufficient to heat seal the capsules without damaging the capsules and ensuring that there will be no impact on the overall shape of the capsule and the ingredient inside the capsule. Accordingly, the first (101) and second (102) plates as well as the heating element are made from a material depending on the predetermined temperature to which the plates are to be heated as per requirement. In an exemplary non-limiting embodiment, the predetermined temperature is in the range from 80° C. to 90° C. It may be appreciated that the temperature is not intended to be limited to 80° C. to 90° C., as the same is mentioned merely for the sake of brevity and understanding of the invention, and that temperature can fall in any range as per requirement, all falling within the scope of the present invention.

To ensure that the plates (101, 102) are not overheated, one or more temperature sensors (107) are placed/inserted in any one or both the plates (101, 102). The temperature sensors (107) are connected to a control unit (not particularly shown) to continuously transmit the temperature of the plates to the control unit. In the event that the temperature sensed by the sensors (107) exceeds the predetermined temperature, the control unit shuts down the capsule filling machine.

Figure 3A:
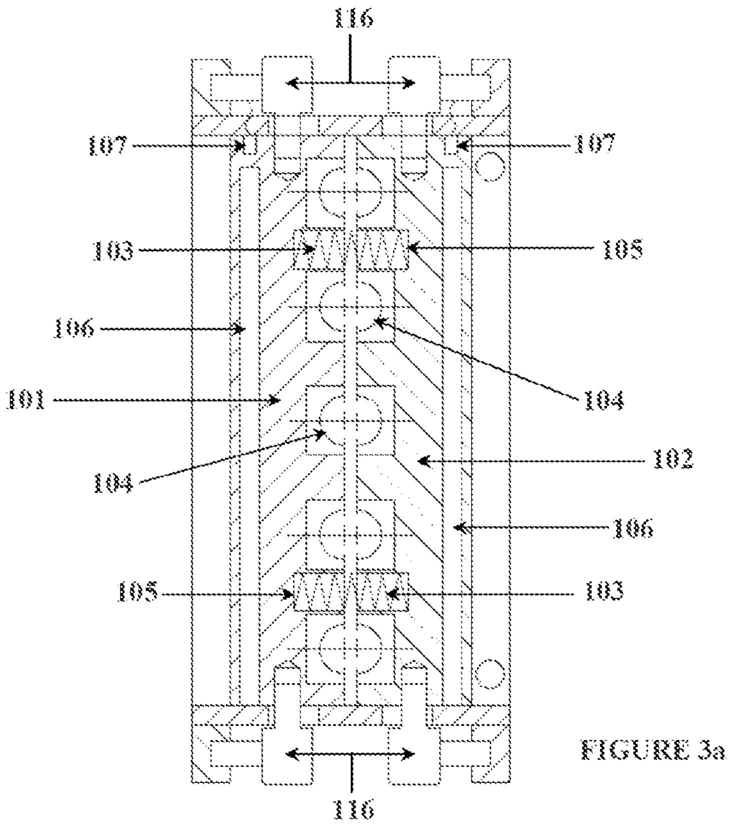
Figure 3B:
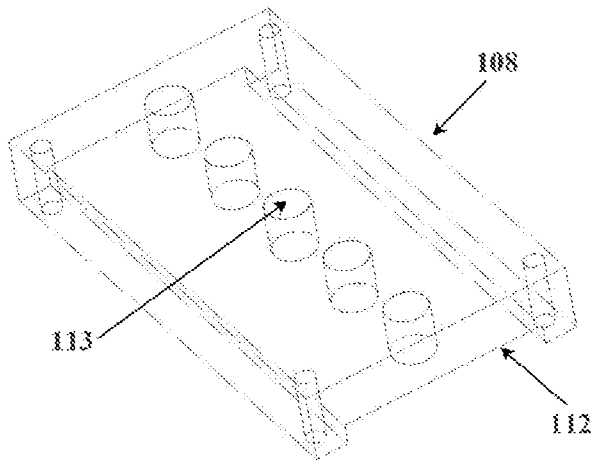

Referring to FIG. 3*b*, the housing comprises at least two plates viz. a third plate (108) and a fourth plate (109) attachable to each other. While FIG. 3*b* illustrates only one plate, it is to be understood that both the third (108) and fourth (109) plates have identical structural configuration. Typically, the third (108) and fourth (109) plates are attached to each other by one or more attachment means (118) such as nuts and bolts, etc. The third (108) and fourth (109) plates each comprise an elongated cavity (112) engraved therein whereby a hollow chamber is formed between the third (108) and fourth (109) plates when attached to each other. Further, each of the third (108) and fourth (109) plates comprise a plurality of through-holes (113) formed centrally along the length thereof. The first (101) and second (102) plates are disposed longitudinally adjacent to each other in the hollow chamber formed between the third (108) and fourth (109) plates and fastened thereto.

Figure 4:
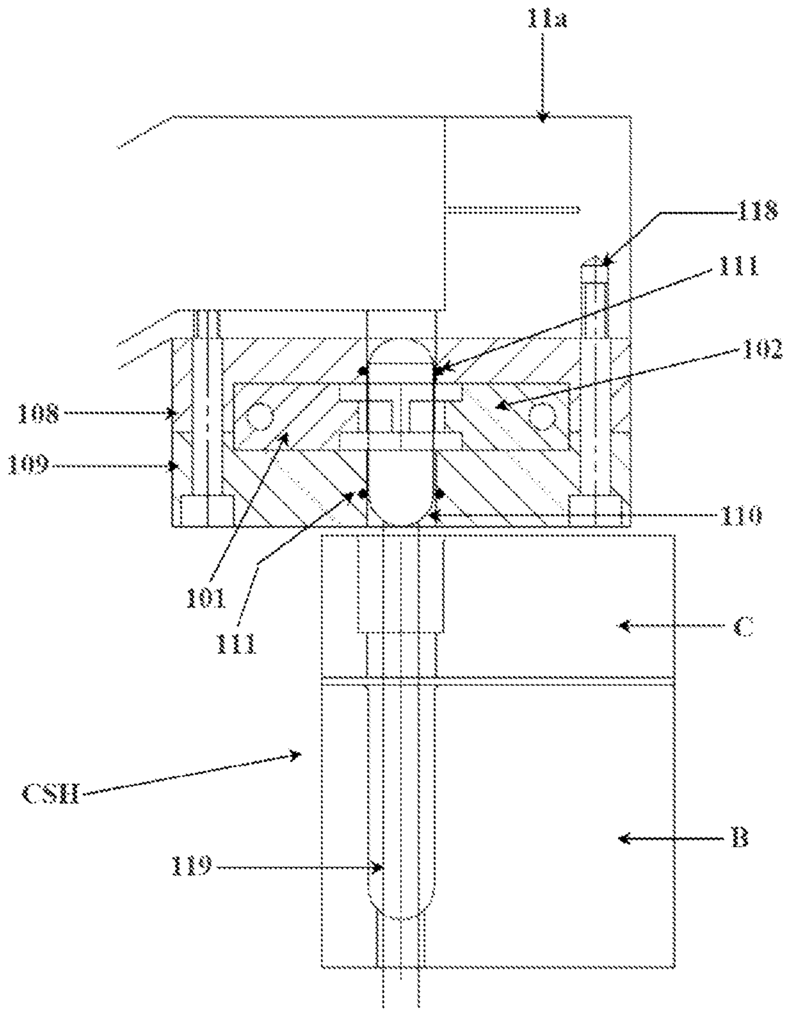

As illustrated in FIG. 4, the heating unit is positioned between the capsule ejecting chute (11*a*) of the capsule filling machine and the capsule holder (CSH) of the turret (T). Typically, the heating unit is attached to a bottom surface of the capsule ejecting chute (11*a*) such that the heating unit gets positioned above the capsule holder (CSH) having a plurality of through-holes (O) holding the plurality of capsules. The one or more attachment means (118) attaching the third (108) and fourth (109) plates pass further into one or more bores (not particularly shown) of the capsule ejecting chute (11*a*) to attach the heating unit to the bottom surface of the capsule ejecting chute (11*a*) [refer FIG. 2*b*]. Further, the plurality of through-holes (113) formed centrally along the length of each of the third (108) and fourth (109) plates correspond to the grooves (104) and circular holes between the first (101) and second (102) plates. Thus, when the first (101) and second (102) plates are abutted to each other, the circular holes formed therebetween align with the through-holes (113) of the third (108) and fourth (109) plates to form a plurality of passages (110) through the heating unit. Accordingly, the positioning of the heating unit between the capsule ejecting chute (11*a*) and the capsule holder (CSH), results in the plurality of passages (110) of the heating unit aligning with the plurality of through-holes (O) of the capsule holder (CSH) and a plurality of holes (not particularly shown) in the bottom surface of the capsule ejecting chute (11*a*), thereby facilitating receipt of filled capsules from the capsule holder (CSH) in the heating unit for heat sealing of the filled capsules and transfer of the heat sealed capsules to the capsule ejecting chute (11*a*) for ejection into a collector placed therebelow.

To prevent the capsules received in the passages (110) from slipping down, O-rings (111) are provided in the passages (110) which firmly hold the capsules therein, whereby the capsules can be easily captured in the circular holes between the first (101) and second (102) plates. Each capsule that gets captured in the circular holes is heat fused at a junction where the cap and the body of each capsule overlap when telescopically joined. Heat from the surfaces of the grooves (104) of plates (101, 102) gets conducted onto the junction where the cap overlaps the body resulting in heat fusion of the cap to the body of the capsule. In an exemplary non-limiting embodiment, the first (101) and second (102) plates have a width (W) or thickness of one millimetre, whereby heat is conducted specifically onto one millimetre portion of the capsule cap and body overlapping junction, while the remainder portion of the capsule shell in the passage is insulated from heat as the same gets enclosed by the housing, i.e. the third (108) and fourth (109) plates. It may be appreciated that the thickness of the first and second plates (101, 102) is not intended to be limited to one millimetre, as the same is mentioned merely for the sake of brevity and understanding of the invention, and that the plates (101, 102) can have varying thickness as per requirement, all falling within the scope of the present invention.

Figure 3C:
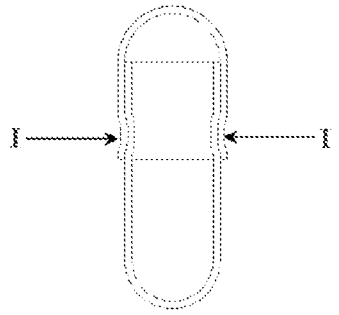

Referring to FIG. 3*c*, an indent (I) is formed in the capsule shell at the junction where the cap is heat fused to the body, to produce a one-piece capsule. The heat sealed one-piece capsule cannot be opened and any attempt made to open the capsule will result in permanent damage to the capsule shell (cap and/or body).

Figure 3D:
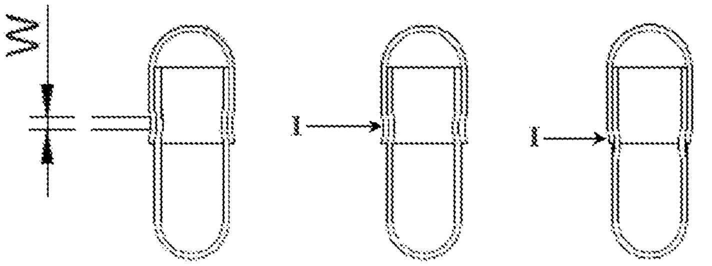

Referring to FIG. 3*d*, the junction can be in the middle of the capsule and/or offset from the middle, such that the indent (I) can be formed at different places within the cap and body overlapping portions on the surface of the capsules. In an embodiment, the elongated cavities can be engraved equally in both the third (108) and fourth (109) plates such that the hollow chamber is formed in the centre of the housing, and the disposition of the first (101) and second (102) plates in the centre of the housing causes the junction to be in the middle of the capsule. In other embodiments the elongated cavities can be engraved in the third (108) and fourth (109) plates in a manner so that the hollow chamber is offset from the centre of the housing whereby the first (101) and second (102) plates are also disposed offset from the centre of the housing which causes the junction to be offset from the middle of the capsule. Additionally, the breadth of first (101) and second (102) plates can be adjusted to increase/decrease the depth of the indent (I). Alternately, the disposition of the first (101) and second (102) plates can be in the hollow chamber can be adjusted to increase/decrease the depth of the indent (I). Thus, the capsule sealing system according to the present invention facilitates heat sealing of the capsules at different places and upto different depths within the cap and body overlapping portions on the surface of the capsules.

Figure 3E:
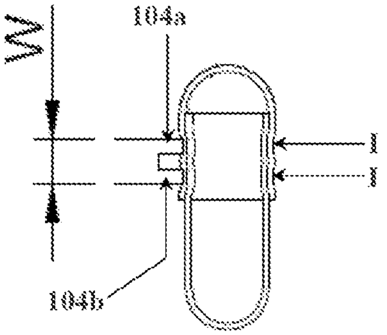

In another embodiment, illustrated in FIG. 3*e*, the first (101) and second (102) plates have a bigger width (W) to comprise stepped grooves (104) carved along inner longitudinal sides thereof. Each stepped groove (104) comprises arcuate extensions (104*a*, 104*b*). Accordingly, when the capsule is captured in the circular holes, heat from the surfaces of the arcuate extensions (104*a*, 104*b*) of the stepped grooves (104) gets conducted onto the junction where the cap overlaps the body resulting in heat fusion of the cap to the body of the capsule simultaneously at more than one place/junction in the overlapping portion between the cap and the body. The junction can be in the middle of the capsule and offset from the middle. As a result, more than one indent (I) is formed in the capsule shell within the overlapping portion where the cap is heat fused to the body, as illustrated in FIG. 3*e*. It may be appreciated that the stepped grooves (104) are not intended to be limited to having two arcuate extensions (104*a*, 104*b*), as shown in the FIG. 3*e*, as the same is shown merely for the sake of brevity and understanding of the invention, and that the stepped grooves (104) can have multiple arcuate extensions as per requirement, whereby multiple indents (I) can be formed in the capsule shell within overlapping portions where the cap is heat fused to the body, all falling within the scope of the present invention. Thus, the capsule sealing system according to the present invention also facilitates heat sealing of the capsules at one or more places within the cap and body overlapping portions on the surface of the capsules.

Figure 5A:
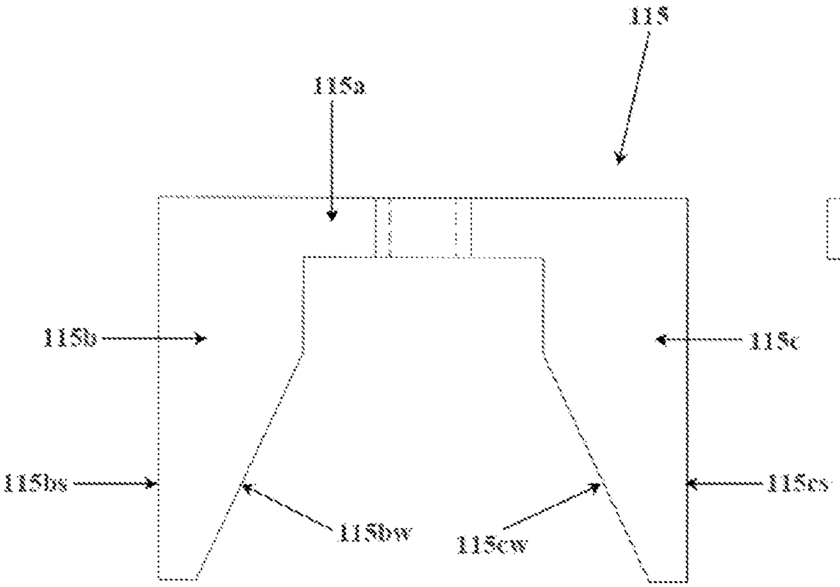
Figure 5B:
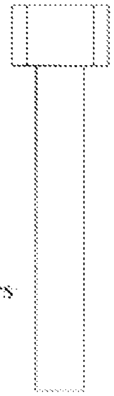

The engagement mechanism comprises one or more pneumatic cylinder(s) (114), one or more cam plate(s) (115), and one or more cam follower pins (116). The pneumatic cylinders (114) are mounted on the capsule filling machine. As illustrated in FIGS. 2*a*-2*d*, the pneumatic cylinders (114) are mounted typically on opposite sides of the capsule ejection chute (11*a*), and a cam plate (115) is operatively coupled to each pneumatic cylinder (114) to be vertically displaced by the pneumatic cylinder. Referring to FIGS. 5*a* and 5*b*, in an embodiment, each cam plate (115) comprises an elongated strip (115*a*) with two integral arms (115*b*, 115*c*) extending out at right angles on either side of the elongated strip (115*a*). Each arm comprises at least a wedge shaped surface (115*bw*, 115*cw*) on an inner side thereof and a straight surface (115*bs*, 115*cs*) on an outer side thereof.

Figures 2A, 2B, 2C, 2D:
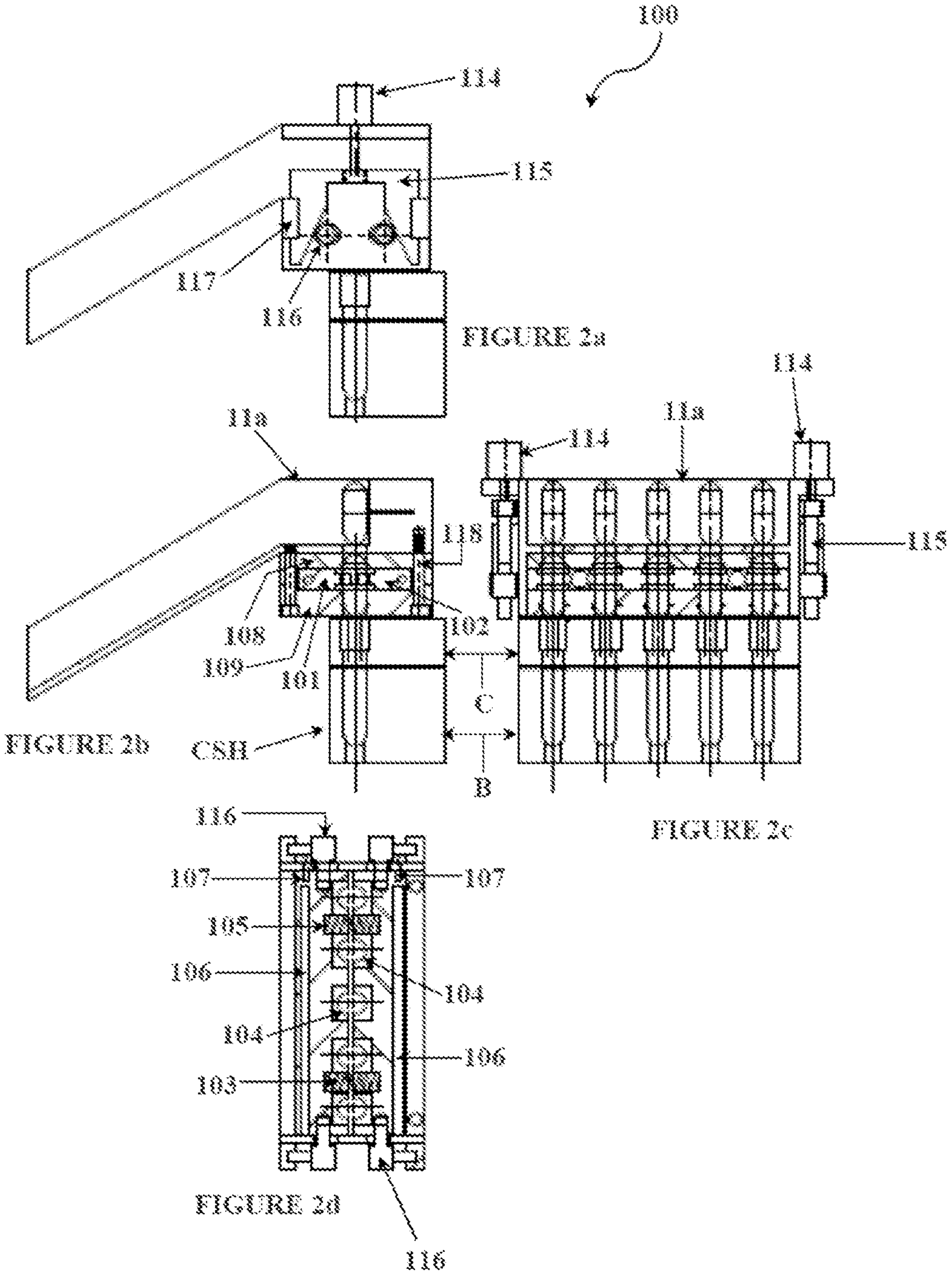

Typically, a cam follower pin (116) is affixed to opposite sides of each of the first (101) and second (102) plates [refer FIG. 3*a*], corresponding to the sides where each cam plate (115) is operatively coupled to each pneumatic cylinder (114) [refer FIG. 2*c*]. Each cam plate (115) is operatively coupled to its respective pneumatic cylinder (114) in a manner such that the arms (115*b*, 115*c*) of each cam plate (115) at the wedge shaped surfaces (115*bw*, 115*cw*) thereof tangentially engage with the cam follower pins (116) of the first (101) and second (102) plates. Thus, the wedge shaped surfaces (115*bw*, 115*cw*) of the cam plate (115) at one side of the capsule ejecting chute (11*a*), tangentially engage with the cam follower pins (116) affixed to the first (101) and second (102) plates at that respective side. Therefore, at each forward stroke of each pneumatic cylinder (114), each cam plate (115) gets vertically displaced in the downward direction causing the wedge shaped surfaces (115*bw*, 115*cw*) of the respective arms (115*b*, 115*c*) to slide over the respective cam follower pins (116) and push/force the cam follower pins (116) horizontally inward towards each other and thereby horizontally displacing the first (101) and second (102) plates inward to abut each other against the bias of the biasing means.

Further, the engagement mechanism includes one or more cam plate guides (117) provided to facilitate vertical displacement of the cam plates (115). Typically, two cam plate guides (117) are mounted on either sides of the capsule ejecting chute (11*a*) corresponding to the sides where each cam plate (115) is operatively coupled to each pneumatic cylinder (114) [refer FIGS. 2*a* and 2*c*], and are spaced apart at a distance equivalent to the length of the elongated strip (115*a*) of each cam plate (115), whereby the arms (115*a*, 115*b*) of each cam plate (115) slide within the cam plate guides (117). The straight surfaces (115*bs*, 115*cs*) on outer side of the arms (115*b*, 115*c*) engage with the internal surface of the cam plates guides (117) for smooth sliding of the arms (115*b*, 115*c*) within the cam plate guides (117).

It may be appreciated that the engagement mechanism is not intended to be limited to the combination of pneumatic cylinder(s) (114), cam plate(s) (115), and cam follower pins (116), as the same is mentioned merely for the sake of brevity and understanding of the invention, and that the engagement mechanism, in other embodiments, can comprise electric drive(s) and other like mechanisms, capable of engaging and displacing the first (101) and second (102) plates, all falling within the scope of the present invention.

Figure 6:
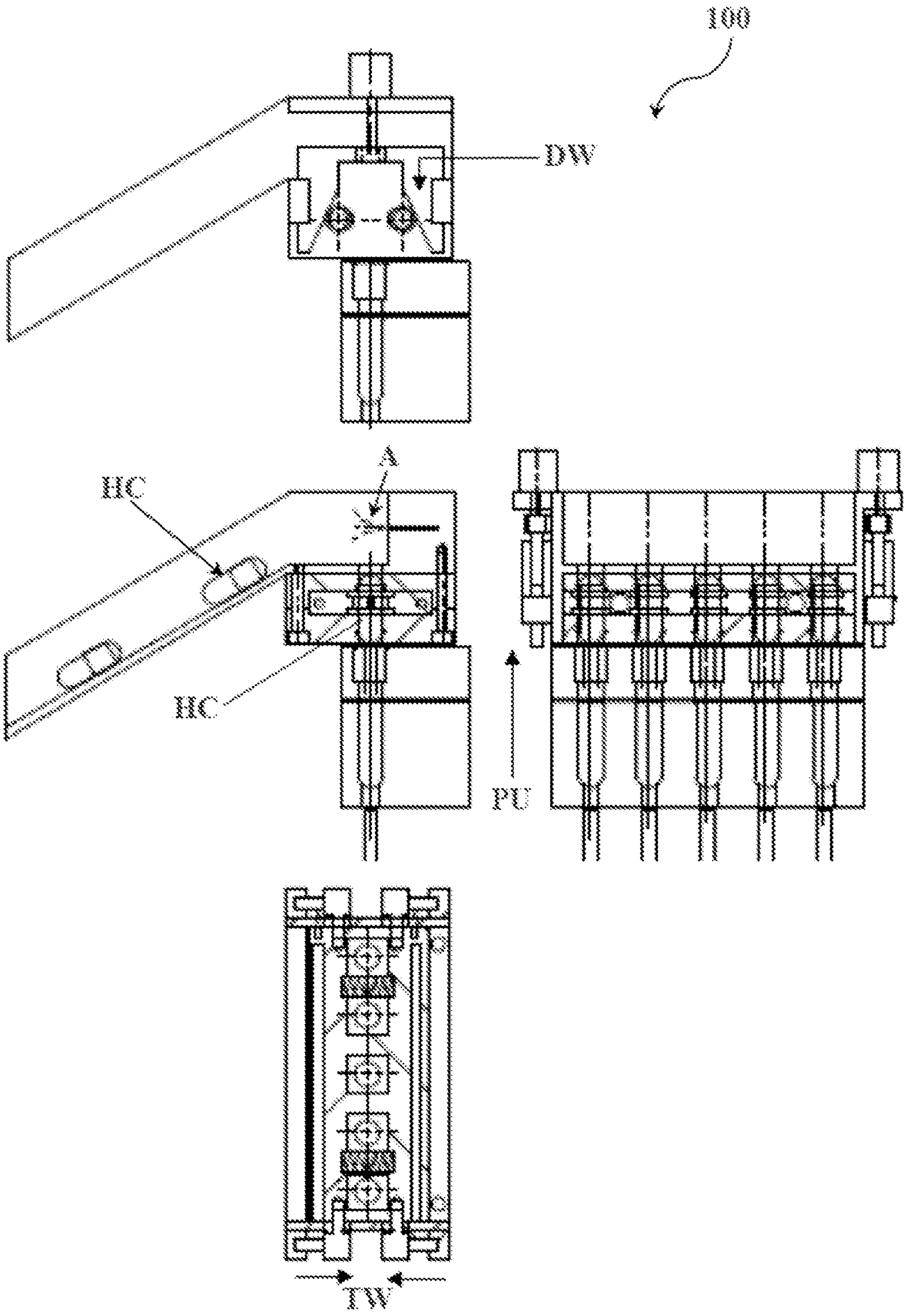
FIG. 6 illustrates perspective views depicting operation of the capsule sealing system as illustrated FIGS. 2*a*-2*d*.
Figure 7:
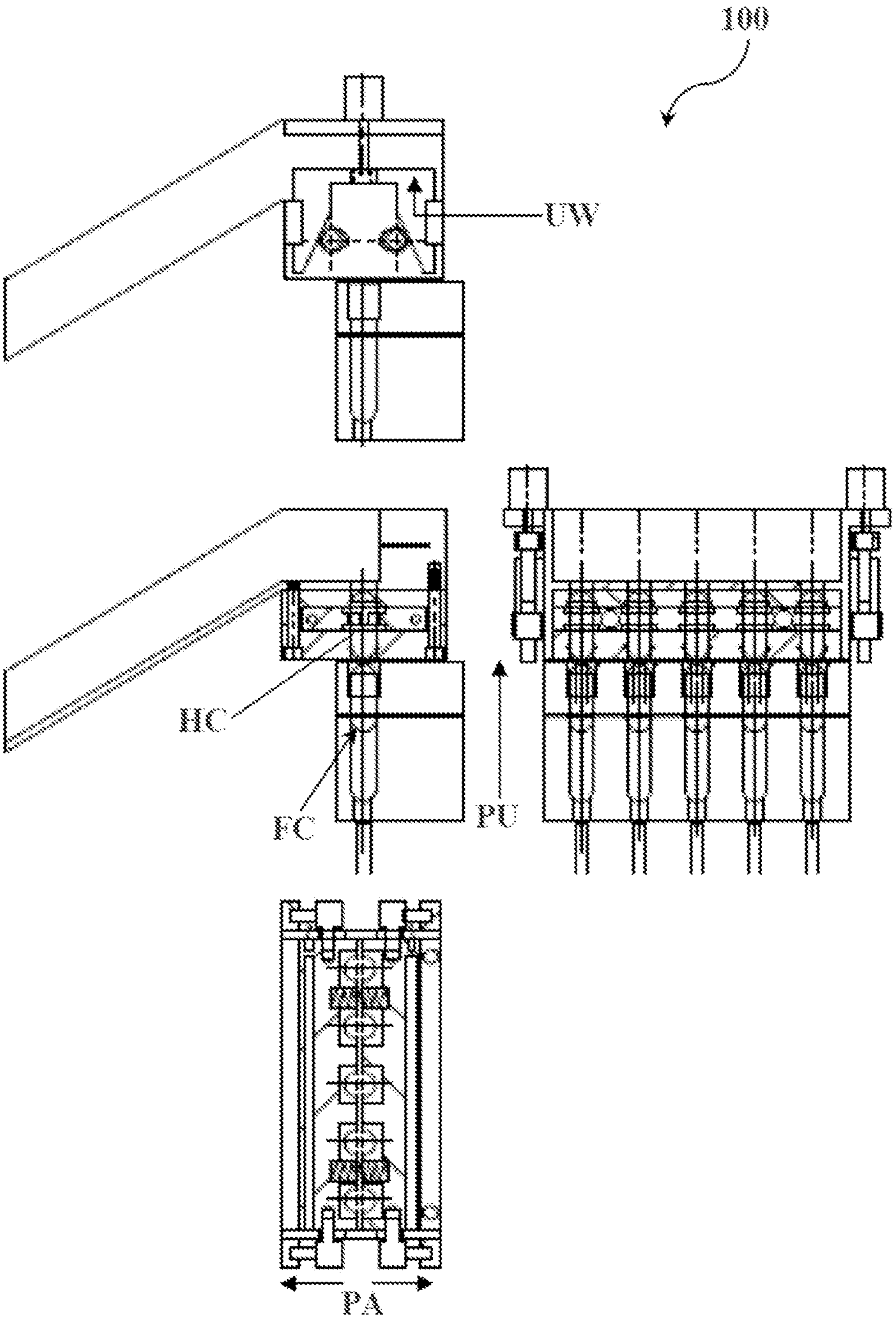
FIG. 7 illustrates perspective views depicting operation of the capsule sealing system as illustrated in FIGS. 2*a*-2*d*.

Referring to FIGS. 6 and 7, the operation of the capsule sealing system for heat sealing of the capsules will now be described in accordance with an exemplary embodiment of the present invention. When the turret (T) of the capsule filling machine rotates from the closing station (9) and comes to a halt at the filled capsule ejection station (11), the capsule holder (CSH) comprising a plurality of filled capsules (FC) gets aligned with the heating unit attached to the capsule ejecting chute (11*a*). The filled capsules (FC) are then pushed upwards [denoted by arrow (PU)] in the heating unit, typically, by pistons (119) of the capsule filling machine and are received in the passages (110) of the heating unit. Each capsule (FC) is held firmly in place by the O-rings (111), whereby an overlapping junction of the telescopically joined cap and body of each capsule, settles adjacent to the grooves (104) of the first (101) and second (102) heat conductive plates of the heating unit. Thereafter, each pneumatic cylinder (114) of the ejection mechanism is operated. The forward stroke of each pneumatic cylinder (114) vertically displaces each cam plate (115) in the downward direction [denoted by downward arrow (DW)] causing the wedge shaped surfaces (115*bw*, 115*cw*) of the arms (115*b*, 115*c*) of each cam plate (115) to slide over the respective cam follower pins (116) and push/force the cam follower pins (116) horizontally towards each other, which in turn horizontally displaces the first (101) and second (102) plates towards each other [denoted by arrows (TW)], to abut each other against the bias of the biasing means (103), i.e. against the spring bias. As the first (101) and second (102) plates abut each other, the grooves (104) form the circular holes wherein the overlapping junction of the capsules is captured. Heat from the surfaces of the grooves (104) of plates (101, 102) gets conducted onto the overlapping junction and each capsule is heat fused at the overlapping junction to heat seal the capsule to produce a heat sealed one-piece capsule (HC).

Thereafter, the stroke of each pneumatic cylinder retracts which vertically displaces each cam plate (115) in the upward direction [denoted by upward arrow (UW)] whereby the force of each cam plate (115) on the respective cam follower pins (116) also reduces. As a result, the first (101) and the second (102) plates also get pushed apart [denoted by arrows (PA)] by the biasing means/spring (103) and are completely spaced apart in the housing by the time the cam plates (115) completely go up. The heat sealed one-piece capsules are still firmly held in place in the passages by the O-rings. At the same time, the turret (T) again rotates from the closing station (9) and comes to a halt at the filled capsule ejection station (11) with a next set of filled capsules (FC) in the capsule holder (CSH). Thereafter, the pistons (119) push the next set of filled capsules (FC) upwards in the heating unit, which in turn push the heat sealed capsules (HC) further upwards in the capsule ejection chute (11*a*) from where the heat sealed capsules (HC) are then forced out of the chute by blowing air (A) to slide down, denoted by arrow (SD), from the capsule ejection chute (11*a*) and are collected in a collector placed therebelow. The next set of filled capsules (FC) are now received in the heating unit where they are heat sealed as described herein above and thereafter pushed out with another set of filled capsules, and the cycle repeats. The heat sealed one-piece capsules cannot be opened and any attempt made to open the capsules will result in permanent damage to the capsule shell (cap and/or body). The capsule sealing system according to the present invention thus efficiently seals the capsules and makes the capsules tamper proof and protects the capsules from adulteration, ensuring positive retention of ingredients filled therein.

Typically, the first and second plates (101, 102) are abutted to each other for a predetermined time sufficient to capture each capsule in the circular holes formed therebetween and heat seal each capsule. Accordingly, the strokes of each pneumatic cylinder (114) is adjusted to vertically displace each cam plate (115) downward for a time period equivalent to that predetermined time and abut the first and second plates (101, 102) to each other for that predetermined time sufficient to capture and heat seal each capsule. Furthermore, the predetermined time is also calculated based on the predetermined temperature to which the plates are heated just sufficient to heat seal the capsules without damaging the capsules. In an exemplary embodiment, the predetermined time is 200 msec to 500 msec. It may be appreciated that the time period is not intended to be limited to 200 msec to 500 msec, as the same is mentioned merely for the sake of brevity and understanding of the invention, and that time period can fall in any range as per requirement, all falling within the scope of the present invention.

The operation of the capsule sealing system gives rise to a method for sealing of a capsule, wherein the method comprises a step of heating a junction of a cap and a body of the capsule where the cap and the body overlap when telescopically joined, to heat fuse at least the cap to the body and heat seal the capsule. In accordance with the method, the junction can be in the middle of the capsule or offset from the middle of the capsule, and at one or more places within overlapping portions of the cap and the body of each capsule.

Thus, the present invention provides an improved capsule sealing system which can operate to implement the method/technique of sealing on a continuous basis to efficiently seal capsules with increasing handling capacity, and eliminates the disadvantages and inconveniences inherent to the prior art conventional capsule sealing techniques and apparatuses. Accordingly, at least some of the technical and economic advantages provided by the present invention, include:

- heat sealing capsules to produce a one-piece capsule which cannot be opened, thus making the capsules tamper proof and protecting filled capsules from adulteration;
- direct deployablity of the capsule sealing system in the capsule filling machine itself, thereby eliminating the requirement of external sealing machines/apparatuses;
- heat sealing capsules in a capsule filling machine itself;
- efficient sealing of capsules and ensuring positive retention of ingredients filled therein; and
- versatility of heat sealing all types of capsules such as gelatin, HPMC, pulluan capsules, and the like.

The foregoing description of the invention has been set merely to illustrate the invention and is not intended to be limiting. Since modifications of the disclosed embodiments incorporating the substance of the invention may occur to person skilled in the art, the invention should be construed to include everything within the scope of the invention.

The invention claimed is:

1. A sealing system (100) for capsule filling machine, said system (100) comprising:

a heating unit for mounting on the capsule filling machine and receiving therein a plurality of filled capsule (FC) from a capsule holder (CSH) of the capsule filling machine, said heating unit comprising a first plate (101) and a second plate (102) spaced apart from each other by at least one biasing means (103), each plate (101, 102) having a plurality of grooves (104) forming a plurality of circular holes between said plates (101, 102) when abutted to each other against the biasing means (103), to capture and heat seal each capsule at one or more places by heat fusion of at least a cap of the capsule; and an engaging mechanism for abutting said first and second plates (101, 102) of said heating unit against the biasing means.

2. The system (100) as claimed in claim 1, wherein said first and second plates (101, 102) are disposed adjacent to each other in a housing, and each of said first and second plates (101, 102) includes:

a plurality of slots (105) forming a plurality of keyholes between said plates (101, 102) when disposed adjacent to each other in said housing, each keyhole accommodating said biasing means (103);

a heating channel (106) with a heating element placed therein for heating of said plates (101, 102); and at least a temperature sensor placed within at least one of said first and second plates to sense temperature of said plates (101, 102).

3. The system (100) as claimed in claim 1, wherein said biasing means (103) is a spring.

4. The system (100) as claimed in claim 1, wherein:

said heating unit is attached to a bottom surface of a capsule ejecting chute (11*a*) of the capsule filling machine and positioned above said capsule holder (CSH) having a plurality of through-holes (O) holding the plurality of filled capsules (FC);

said housing includes a third plate (108) affixed to a fourth plate (109), each of said third and fourth plates (108, 109) having a plurality of through-holes (113) formed therein; and said circular holes formed between said first and second plates (101, 102) align with said through-holes (113) of said third and fourth plates (108, 109) to form a plurality of passages (110) through said heating unit, and said passages (110) align with said plurality of through-holes (O) of said capsule holder (CSH) and a plurality of holes in said capsule ejecting chute (11*a*) when said heating unit is attached to the bottom surface of said capsule ejecting chute (11*a*) and positioned above said capsule holder (CSH).

5. The system (100) as claimed in claim 1, wherein said first and second plates (101, 102) are made from heat conducting material selected from metal and metal alloys.

6. The system (100) as claimed in claim 4, wherein said third and fourth plates (108, 109) are made from heat insulating material.

7. The system (100) as claimed in claim 1, wherein the one or more places are within overlapping portions of the cap and the body of each capsule.

8. The system (100) as claimed in claim 1, wherein said engaging mechanism comprises:

at least one pneumatic cylinder (114) for mounting on the capsule filling machine;

at least one cam plate (115) operatively coupled to said pneumatic cylinder (114) to be vertically displaced by said pneumatic cylinder (114); and at least one cam follower pin (116) affixed to each of said first and second plates (101, 102) to be horizontally displacement of the cam follower pins (116) enables said first and second plates (101, 102) to abut each other against the bias to form said circular holes.

9. The system (100) as claimed in claim 8, wherein said at least one came plate (115) includes two arms (115*b*, 115*c*), each arm having at least a wedge shaped surface (115*bw*, 115*cw*) tangentially engaging each cam follower pin (116) to horizontally displace said first and second plates (101, 102) through vertical displacement of said cam plate (115).

10. The system (100) as claimed in claim 8, wherein:

said at least one pneumatic cylinder (114) is mounted on said capsule ejecting chute (11*a*) of the capsule filling machine; and one or more cam plate guides (117) are mounted on said capsule ejecting chute (11*a*) for sliding of said arms within said cam plate guides for vertical displacement of said cam plate (115).

* * * * *